(12) United States Patent
Geppert et al.

(10) Patent No.: US 10,487,862 B2
(45) Date of Patent: Nov. 26, 2019

(54) CLAMP

(71) Applicant: NORMA Germany GmbH, Maintal (DE)

(72) Inventors: Helmut Geppert, Karlstein (DE); Frank Schmidt, Langenselbold (DE); Michael Sommer, Budingen (DE)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 15/314,473

(22) PCT Filed: May 27, 2015

(86) PCT No.: PCT/EP2015/061706
§ 371 (c)(1),
(2) Date: Nov. 28, 2016

(87) PCT Pub. No.: WO2015/181236
PCT Pub. Date: Dec. 3, 2015

(65) Prior Publication Data
US 2017/0191512 A1      Jul. 6, 2017

(30) Foreign Application Priority Data
May 27, 2014   (DE) .................. 10 2014 107 442

(51) Int. Cl.
*F16B 2/08*      (2006.01)
*F16B 2/06*      (2006.01)
(Continued)

(52) U.S. Cl.
CPC ............ *F16B 2/065* (2013.01); *F16L 3/1233* (2013.01); *F16L 55/035* (2013.01); *F16B 2/08* (2013.01)

(58) Field of Classification Search
USPC ....... 248/65, 70, 228.8, 230.8, 228.6, 230.6, 248/231.71
See application file for complete search history.

(56) References Cited

U.S. PATENT DOCUMENTS 2,409,772 A * 10/1946 Lund ..................... F16L 3/1233
174/40 CC
RE22,846 E * 2/1947 Morehouse ........... F16L 3/1233
174/40 CC (Continued)

FOREIGN PATENT DOCUMENTS

DE      9214700 U1     3/1993
DE     19716632 A1    10/1998
(Continued)

OTHER PUBLICATIONS

Chinese Patent Office, First Office Action, Chinese Patent Application No. 201580027682.8, dated Jan. 30, 2018.
(Continued)

*Primary Examiner* — Alfred J Wujciak
(74) *Attorney, Agent, or Firm* — Ice Miller LLP

(57) ABSTRACT

The invention relates to a clamp (1), in particular for fastening tubular objects to an underlying surface, comprising a clamp band (2), which has a first peripheral end (3) having a first leg (4) and a second peripheral end (5) having a second leg (6), and comprising at least one clip (7, 71), which is arranged on at least one of the legs (4, 6) on a side opposite the other leg (6, 4). The problem addressed by the invention is that of designing such a clamp in a simple manner and provide said clamp economically. This problem is solved in that the clamp band (2) has at least one projection (21), which interacts with the at least one clip (7, 71).

14 Claims, 16 Drawing Sheets

(51) Int. Cl.
*F16L 3/123* (2006.01)
*F16L 55/035* (2006.01)

(56) References Cited

U.S. PATENT DOCUMENTS

| | | | | |
|---|---|---|---|---|
| 2,655,703 | A * | 10/1953 | Flora | F16L 3/1233 24/16 R |
| 2,941,768 | A * | 6/1960 | Elms | F16L 3/1233 24/343 |
| 3,376,004 | A * | 4/1968 | Goldman | F16L 3/123 24/16 R |
| 3,460,788 | A * | 8/1969 | Goldman | F16L 3/1233 24/279 |
| 3,995,795 | A * | 12/1976 | Hogan | F16L 3/1233 248/68.1 |
| 4,441,677 | A * | 4/1984 | Byerly | F16L 3/1233 24/16 PB |
| 5,377,940 | A * | 1/1995 | Cabe | F16L 3/1233 248/68.1 |
| 8,235,332 | B2 * | 8/2012 | Cesarino | B60R 16/0215 248/65 |
| 9,829,119 | B2 * | 11/2017 | Desjardins | F16L 3/233 |
| 2007/0257161 | A1 * | 11/2007 | Geppert | F16L 3/12 248/74.3 |
| 2011/0024579 | A1 * | 2/2011 | Cesarino | F16L 3/1233 248/75 |

FOREIGN PATENT DOCUMENTS

| | | |
|---|---|---|
| DE | 10200801092 A1 | 9/2009 |
| EP | 0597193 A | 5/1994 |
| EP | 2280206 A1 | 2/2011 |
| GB | 578891 A | 7/1946 |
| JP | 2016-568026 A | 11/2017 |

OTHER PUBLICATIONS

Japanese Patent Office, English Translation of Notice of Reasons of Rejection, Japanese Patent Application No. 2016-568026, dated Nov. 22, 2017.
European Patent Office, International Search Report, dated Aug. 25, 2015.
European Patent Office, International Search Report, dated Aug. 25, 2015, English Translation.
European Patent Office, Written Opinion of the International Searching Authority dated Aug. 25, 2015.

* cited by examiner

CLAMP

CROSS-REFERENCE TO RELATED APPLICATIONS

The present application is a U.S. national stage of, and claims the priority benefit of, International Patent Application Serial No. PCT/EP2015/061706, filed May 27, 2015 and also claims the priority benefit of German Patent Application Serial No. 10 2014 107 442.4 filed May 27, 2014, the text and drawings of which are hereby incorporated by reference in their entireties.

The invention relates to a clamp, in particular for fastening tubular articles to an underlying surface, having a clamp band with a first peripheral end which has a first leg and a second peripheral end which has a second leg, and having at least one lug which is arranged on at least one of the legs on a side opposite the in each case other leg.

Such a clamp is known for example from EP 1 852 643 A2. The clamp band of such a clamp is bent in a C shape and encloses a receiving space. It is possible for example for a pipe, or some other article having a cross-sectional geometry in the form of a circular ring, to be positioned in this receiving space. By placing one of the two legs on top of the other, the clamp is closed and the article located therein is fixed such that it can be fastened to an underlying surface, for example a carrier, a ceiling, a wall, a housing or the like. The two legs have matching through-holes that are congruent in the closed state of the clamp, it being possible for a retaining element, for example a screw, to be passed through said through-holes. With the aid of this retaining element, the clamp is fixed to the underlying surface.

Such clamps have proven themselves in many fields of application. For this reason, they have to be able to be provided in large quantities. Automatic production of the clamp is desired here. In order to make this possible in a cost-effective and time-saving manner, however, there is also the desire to assemble the clamp from as few component parts as possible. This can contribute to a reduction in storage costs and the logistics outlay for the component parts used. There is also a desire to reduce the production costs for the clamp. This can happen for example in that the clamp is constructed in a simple manner.

Therefore, the invention is based on the object of providing a clamp of simple construction in a cost-effective manner.

In the case of a clamp of the type mentioned at the beginning, this object is achieved in that the clamp band has at least one protrusion which cooperates with the at least one lug.

The at least one protrusion is arranged in a spatially limited region of the clamp band and projects beyond the clamp band in a radial direction of the latter. The protrusion can be formed in one piece with the clamp band, for example by cold forming. However, it is also possible to provide the protrusion as a separate component part which is fastened to the clamp band, for example by welding.

A lug is arranged on at least one of the legs on a side opposite the in each case other leg. The lug cooperates with in each case one protrusion. The protrusion serves to fix the lug in position on the respective leg such that it is possible to dispense with further fastening means for the lug here. It is also possible to do away for example with fastening the lug to one of the legs by riveting or welding. The failure-prone fastening of the lug to one of the legs can be dispensed with. The series production of the clamp is simplified and can thus be carried out cost-effectively.

It is preferred in this case that the first and/or second leg and the lug arranged thereon is formed in one piece. It is possible for example to provide cutouts in the transition region between the respective leg and the associated lug such that the clamp band narrows in an axial direction of the clamp. These cutouts then so to speak separate the corresponding leg from the associated lug and make it easier to bend. The lug thus forms an end piece of the respective peripheral end of the clamp band. In order now to arrange the lug on the corresponding leg, the lug is bent in the direction of the clamp band in the region of the cutout such that it can be arranged in the desired position. The one-piece configuration of the leg and associated lug makes the failure-prone supply of a further component part and the fastening thereof during the clamp production process superfluous. Costs for further component parts can be saved and the clamp is constructed in a simple manner, making automated production easier.

Preferably, the at least one lug has in each case one bent end portion which is arranged on a side of the lug that faces the clamp band. The bent end portion in this case represents a further design feature which serves for the simple construction of the clamp. The bent end portion can be formed by simple deformation of the respective lug; an additional component part is not required. In addition, the bent end portion is arranged on a side of the lug that faces the clamp band in order to be able to cooperate with said clamp band or, for example, the protrusion. The bent end portion continues the extent of the lug beyond the respective leg. It avoids a notch effect of the lug on the leg by forces which can occur in the operating state, i.e. in the tensioned state of the clamp.

It is preferred in this case that the in each case one bent end portion points in a direction away from the leg on which the lug having the bent end portion is arranged, and has a recess. The corresponding bent end portion thus continues the extent of the respective lug beyond the associated leg onto the clamp band. The lug is arranged on the leg assigned thereto and leads at one of its ends into the bent end portion. The latter is in turn arranged on the clamp band. This results in greater rigidity of the second peripheral end of the clamp. The bend radii of the bent end portions and of the legs on which the latter are arranged are in this case selected such that the bent end portion closely follows the shape of the second leg. The recess in the bent end portion represents a further design feature which serves for the cooperation of the lug with the protrusion, assigned thereto, of the clamp band.

It is preferred in this case that the respective recess and the protrusion associated therewith are engaged with one another in a form-fitting manner. The form-fitting connection of the recess in the bent end portion of the lug to the protrusion in this case represents the simplest possible design for ensuring engagement between the recess and protrusion. Provision can likewise be made to produce for example a materially integral connection between the recess and protrusion, for instance by welding. The form-fitting engagement of the recess in the bent end portion of the lug in the protrusion allows the lug to latch in position on the corresponding leg of the clamp so as to be prevented from rotating. The lug is thus securely fixed in position without further fastening of the lug to the corresponding leg, for example by welding or riveting, being necessary. In addition to increasing the rigidity as a result of the bent end portion, the engagement of the recess with the protrusion results in an increase in the flexural rigidity of the respective peripheral end. In this way, the bending moments acting on the lug, for example brought about by movement and rotation of the tubular article hold by the clamp, do not result in displacement and releasing of the lug from its position on the respective leg. The structurally simple configuration of the clamp allows it to be produced easily in an automated manner. Likewise, production can take place in a cost-effective and time-saving manner.

Preferably, an extent of the recess in a peripheral direction of the clamp band includes at least half of an extent of the protrusion in this direction. This ensures that the respective recess can be engaged reliably with the protrusion in a form-fitting manner. It ensures that the lug actually latches in the clamp band via the protrusion so as to be prevented from rotating. When the lug is subjected to forces that act in the axial direction of the clamp, the bent end portion is prevented from "slipping out" under the protrusion. The lug is secured so as to be prevented from rotating out of its position by the bending moments acting on it.

Preferably, the protrusion has a greater extent in an axial direction of the clamp band than in the circumferential direction of the clamp band. This furthermore contributes to securing the position of the lug on the leg associated therewith counter to axial forces acting on the lug. The forces acting on the lug can be diverted to the protrusion via the form-fitting engagement of the recess with the latter. The protrusion has in this case a sufficiently long axial extent in order to largely prevent deformation thereof through the action of the bent end portion subjected to axial forces. In this way, the lug is prevented from slipping with respect to the leg on which it is arranged, as a result of deformation of the protrusion.

It is preferred that a radial extent of the protrusion is matched to a radial extent of the respective bent end portion. The radial extent of the protrusion and the radial extent of the bent end portion are preferably selected to be the same in this case. As a result, an optimal form fit can be ensured between the recess and the protrusion. Disengagement of the recess from the protrusion as a result of forces acting on the lug can thus be prevented. Likewise, however, it is possible to provide for the radial extent of the protrusion to be less than the radial extent of the bent end portion; it is also possible to configure the radial extent of the protrusion to be greater than the radial extent of the bent end portion.

Preferably, the protrusion has a first flank and a second flank in the peripheral direction of the clamp band, wherein the first flank leads into the clamp band at a more acute angle than the second flank. The first flank will in this case drop toward the clamp band in a direction away from the lug. The second flank drops toward the clamp band in a direction toward the lug. As a result of the more acute angle at which the first flank leads into the clamp band, it is easily possible to fold the lug into its final position on the leg assigned to it. During this folding, the bent end portion can then "slide down" on the first flank in the direction of the respective leg, until it has passed over the highest point (as seen in the radial direction of the clamp) of the protrusion. The lug will then come to rest in its final position on the corresponding leg, such that the recess of the bent end portion comes into form-fitting engagement with the second flank of the protrusion and with the axial ends of the protrusion.

It is preferred in this case that the second flank is at right angles to the clamp band. As soon as the lug is arranged in its position on the leg associated therewith, renewed "slipping out" and thus disengagement of the recess in the bent end portion from the second flank of the protrusion is prevented as a result. The lug cannot, as is still the case for the first flank with its more acute angle to the clamp band, slide back along the second flank in the direction of the highest point of the protrusion. The lug thus latches as it were in its position on the leg assigned to it; "lifting" of the lug from the corresponding leg is prevented.

Preferably, the first and/or the second leg and the lug arranged thereon have at least one reinforcing bead in the region of the bent end portion thereof. The reinforcing bead in this case brings about an increase in the flexural rigidity of the respective bent end portion and of the respective lug with respect to loads that occur during operation.

It is preferred in this case that the first and/or second leg and the lug arranged thereon have at least one reinforcing bead on each side of the recess in the bent end portion thereof. This results in further rigidification, which can ensure that the lug is held reliably in its position on the respective lug counter to forces that act on the lug in the axial direction.

It is also preferred that the lug is arranged only on a side of the second leg that faces away from the first leg and the first leg is formed by a portion angled out from the clamp band, said angled portion having at least one reinforcing bead. As a result of the one-piece configuration of the lug with the second leg of the clamp, the entire clamp can thus be produced from only one component. As a result of this conceivably simple structural configuration of the clamp, the supply and processing of separate component parts is dispensed with in the production process of the clamp. Automated production of the clamp is easily possible. A reduction in the production costs, storage costs and logistics outlay in the production of the clamp is achieved. Likewise, the error-prone connection of separate component parts is dispensed with, this likewise bringing about an increased service life of the clamp. The production of the clamp can be carried out as a whole in a more cost-effective and time-saving manner.

Finally, it is preferred that, in the open state of the clamp, the first leg has at least one fastening element that protrudes in the direction of the second leg, and the second leg has a fastening portion that is able to be introduced into a gap between the fastening element and an adjacent region, located opposite the fastening element, of the first leg, and that, in the closed state of the clamp, the at least one fastening element has been plastically deformed onto that side of the fastening portion that faces away from the first leg. As a result, a prefixing device for the clamp is provided. Greater security with respect to accidental releasing of the prefixing is achieved. The "open state" of the clamp should be understood as meaning that the clamp has not yet been prefixed to the tubular article and the two legs are thus still spaced apart from one another. The "closed state" of the clamp, by contrast, means a state in which the two clamps have been fixed to one another such that the receiving space enclosed by the clamp band is matched to the tubular article in such a way that the clamp band bears against the article with a degree of pretensioning. As a result of the plastic deformation of the fastening elements onto the fastening portion, these cannot be released again by an elastic movement. Accidental releasing of the prefixing of the clamp can be avoided. In addition, the fastening portion is guided through a gap between the fastening element and the adjacent region when the clamp is in a closed state. As a result, lateral yielding of the fastening portion is prevented; on one side, movement is prevented by the fastening element, on the other side, it is prevented by the adjacent region. The movability of the two legs relative to one another is thus prevented to such an extent that accidental releasing of the prefixing of the clamp can be prevented. The fitter of the clamp can now fasten it to the underlying surface with corresponding retaining elements without having to worry about the clamp disengaging from the tubular article as a result of loads that occur for example during fitting.

The invention is described in the following text by way of preferred exemplary embodiments in conjunction with the drawings, in which:

FIG. 1 shows a perspective view of a first exemplary embodiment of a clamp in a closed state;

FIG. 2 shows a front view of a clamp according to the first exemplary embodiment in a closed state, FIG. 3 shows a bent-open clamp according to the first exemplary embodiment in an intermediate production step, FIG. 4 shows a partially bent-open clamp according to the first exemplary embodiment in a further intermediate production step, FIG. 5 shows a plan view of a clamp band according to the first exemplary embodiment of the clamp, FIG. 6 shows a view of a second peripheral end of a clamp according to the first exemplary embodiment of the clamp, FIG. 7 shows a detail view of a first peripheral end and a front view of a second peripheral end of a clamp according to the first exemplary embodiment of the clamp, FIG. 8 shows a section X-X according to FIG. 9 through a plan view of a protrusion and of a bent end portion, FIG. 9 shows a section XI-XI through the protrusion according to FIG. 8, FIGS. 10A-F show various preferred cross sections of the clamp band, FIG. 11 shows a view of the peripheral ends of a clamp according to a second exemplary embodiment of the clamp, FIG. 12 shows a view of the peripheral ends of a clamp having a prefixing device according to a third exemplary embodiment of the clamp, FIG. 13 shows a view of a first exemplary embodiment of a prefixing device in the open and closed state of the clamp with a section A-A, FIG. 14 shows a plan view of the first exemplary embodiment of a prefixing device, FIG. 15 shows a plan view of a clamp band with design features of the prefixing device according to the first exemplary embodiment thereof, FIG. 16 shows a plan view of a clamp band with design features of the prefixing device according to the second exemplary embodiment thereof.

FIGS. 1 and 2 show a clamp 1 according to a first exemplary embodiment, having a clamp band 2. The clamp band 2 has a first peripheral end 3 with a first end-side leg 4. A second peripheral end 5 of the clamp band 2 has a second leg 6 and a lug 7. The lug 7 is arranged on a side of the second leg 6 that faces away from the first leg 4. The first leg 4, the second leg 6 and the lug 7 each have a through-opening 8. On a side facing the clamp band 2, the lug 7 has a bent end portion 9. In its axial middle, the bent end portion 9 has a recess 10 which is surrounded on both sides by reinforcing beads 11. The recess 10 is engaged with a protrusion 12 in the assembled state of the clamp, said protrusion 12 having a first flank 13 and a second flank 14. The protrusion 12 is arranged on the clamp band 2. When the lug 7 is bent onto the second leg 6, the protrusion 12 audibly latches in the recess 10. As a result, the lug 7 is held on the second leg 6 so as to be prevented from rotating. It is also protected against lifting off the second leg 6. As a result of the bent end portion 9, there are also no sharp edges which could result in a notch effect in the event of force being applied perpendicularly to the second leg 6. The first leg 4 is formed by a portion 15 angled out from the clamp band 2. The first leg 4 in this case has at least one reinforcing bead 6 in the region of the angled portion 15. This reinforcing bead 16 is formed by a transition region 17. Finally, provision can be made for the clamp 1 to be formed with a jacket 18 which can be formed from an elastomeric material, for example EPDM, silicone, TPE, NBR or CR.

FIG. 1 shows the clamp 1 with a clamp band 2 bent in a C shape. The clamp band 2 bent in a C shape in this case encloses a receiving space such that a tubular article can be held firmly in the closed or virtually closed state of the clamp 1.

When the clamp 1 is open, it can be pushed over a tubular article (not illustrated). As a result of the two peripheral ends 3, 5 being pushed together and moved toward one another, the clamp 1 is then closed and fixed in its position on the article.

In the exemplary embodiment in FIG. 1, the first leg 4 is formed by a portion 15 angled out of the clamp band 2 and extends in a virtually rectilinear manner from the clamp band 2. The angled portion 15 serves as a spacer between the clamp band 2 and an underlying surface (not illustrated) to which the clamp 1 is intended to be fastened, in order to create space for the jacket 18 (not illustrated in FIG. 1). However, for example in the case of clamps 1 without a jacket 18 or when required by the installation situation, it is also possible to dispense with the angled portion 15. The second leg 6, and the lug 7 arranged 10 thereon are bent approximately at right angles with respect to the clamp band 2.

The first leg 4, the second leg 6 and the lug 7 in this case each have a through-opening 8. In a closed state of the clamp 1, the three through-openings 8 overlay one another in each case. The through-openings 8 can in this case be provided for example with a circular shape, a circular ring shape or a polygonal peripheral edge. It is likewise possible to configure one or more of the through-openings 8 as a slot. The through-openings 8 serve to receive retaining elements which are used to fasten the clamp 1 to an underlying surface. Such retaining elements can be provided for example by screws or rivets. These are then received in the through-opening 8 and at the same time are engaged with the underlying surface such that the clamp 1 is fastened reliably thereto.

Figure 3:
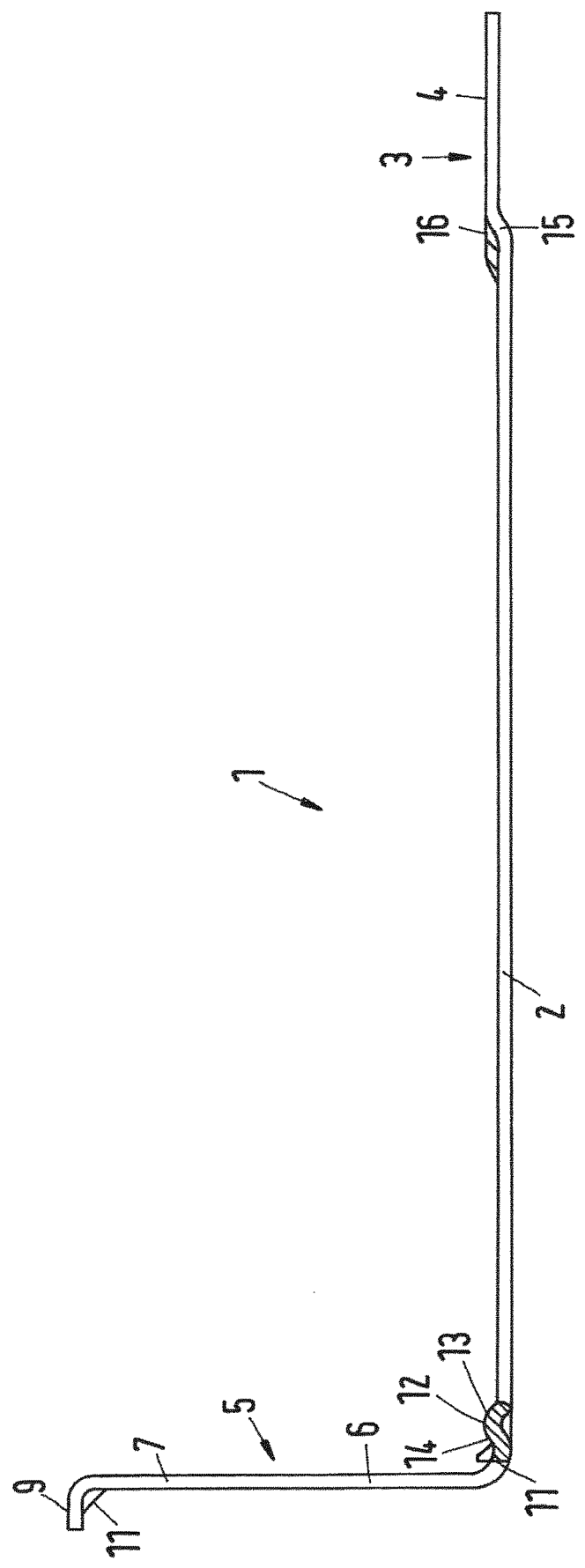
FIGS. 3 to 7 show views of the clamp 1 during the production process, and detail views of some of the design features thereof.

In FIG. 3, the clamp 1 is illustrated in a bent-open state. The clamp band 2 has in this case not yet been bent into the intended C shape. In addition, the lug 7 has not yet been arranged in its position on the second leg 6. The right-hand part of FIG. 3 shows that the first leg 4 has been formed by a portion 15 angled out of the clamp band 2 at the first peripheral end 3 of the clamp band 2. The reinforcing bead 16 is formed in the region of the angled portion 15. The first leg 4 extends in this case in a virtually rectilinear manner from the clamp band 2. On that portion of the clamp band 2 that is located opposite the first peripheral end 3, that is to say in the left-hand part of FIG. 3, a part of the clamp band 2 has been formed into the first flank 13. The first flank 13 forms a part of the protrusion 12. The protrusion 12 has the second flank 14, which again leads into the clamp band 2. The reinforcing bead 11 is provided in the region of this leading of the second flank 14 into the clamp band 2. At the second peripheral end 5 of the clamp band 2, the second leg 6 has been bent approximately at right angles from the clamp band 2.

The second leg 6 is in this case formed in one piece with the lug 7. At its end located opposite the second leg 6, the lug 7 has the bent end portion 9. The bent end portion 9 is bent approximately at right angles from the lug 7. Reinforcing beads 11 are provided in the region of this bend.

Figure 4:
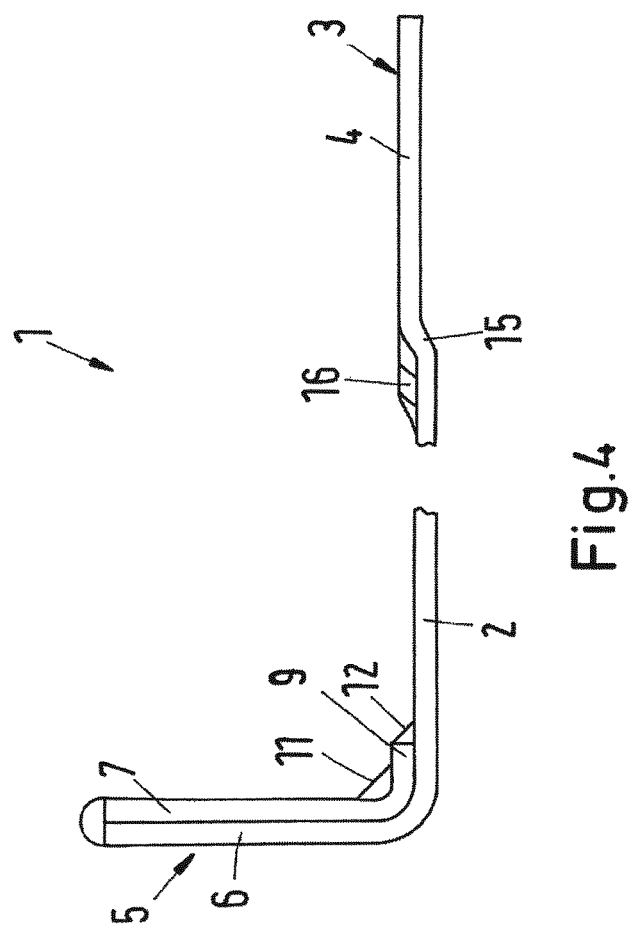

FIG. 4 shows the clamp 1 from FIG. 3 after the lug 7 has been bent into its position on the second leg 6.

Figure 5:
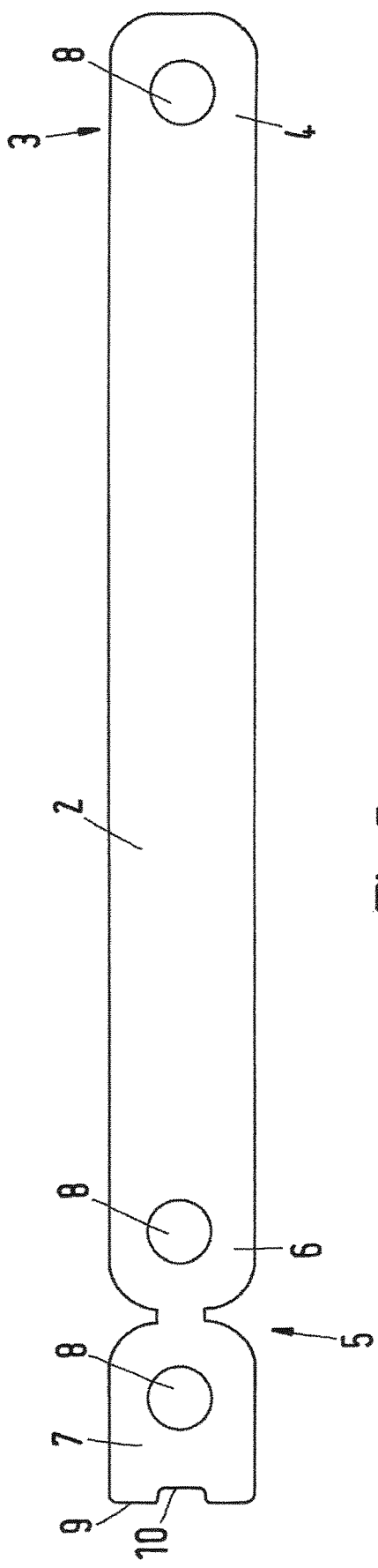

As can be seen in particular from FIG. 5, the second leg 6 is formed in one piece with the lug 7. The second leg 6 has cutouts at its end adjacent to the lug 7, such that the material of the clamp band 2 narrows at the transition from the second leg 6 to the lug 7. In the region of these cutouts, the lug 7 can be bent and arranged in the position intended therefor on that side of the second leg 6 that faces away from the first leg 4.

The arrangement of the lug 7 on the second leg 6 in this case increases the flexural rigidity of the second peripheral end 5 of the clamp 1. The one-piece configuration of the lug 7 with the second leg 6 makes the provision of a second component part for the lug 7 superfluous. Therefore, it is possible to produce the clamp band 2, as is illustrated in FIG. 5, in a cost-effective and time-saving manner in one working step, for example a punching operation.

Figure 6:
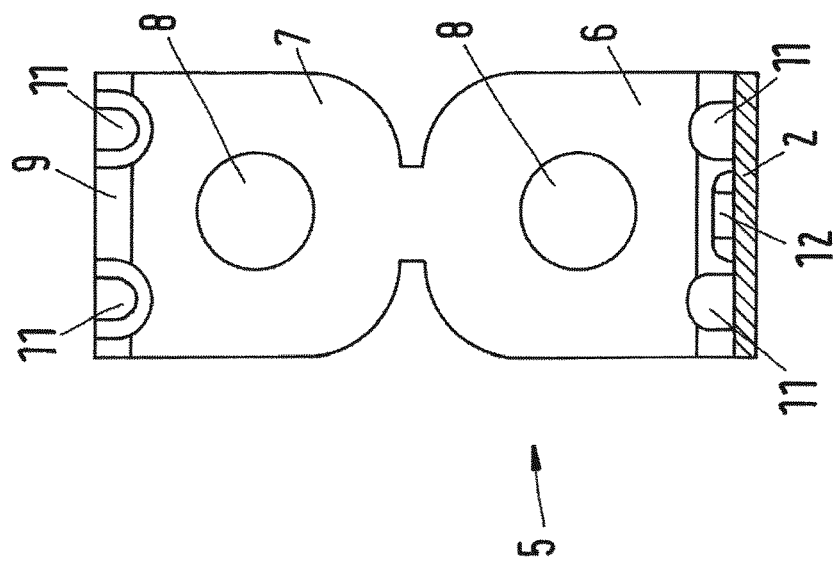

Reinforcing beads 11 can be provided both on the second leg 6 and on the lug 7. Said reinforcing beads 11 can be arranged on both sides of the protrusion 12, or on both sides of the recess 10 in the bent end portion 9. This is shown by way of example in FIG. 6 for a state of the clamp 1 in which the latter is illustrated in a not yet fully assembled manner. The lug 7 is illustrated not yet in its final position on the second leg 6.

The first leg 4, which is arranged approximately tangentially to the clamp band 2, is offset somewhat toward the outside with respect to the straight tangent direction by the angled portion 15. This offset of the angled portion 15 is formed by the transition region 17. The transition region 17 is in this case not formed uniformly over the width of the clamp band 2, or of the first leg 4, but extends in a V shape illustrated in plan view in FIG. 7. The reinforcing bead 16, which contributes toward rigidifying the transition region 17 and thus the angled portion 15, is formed by this profile.

Figure 7:
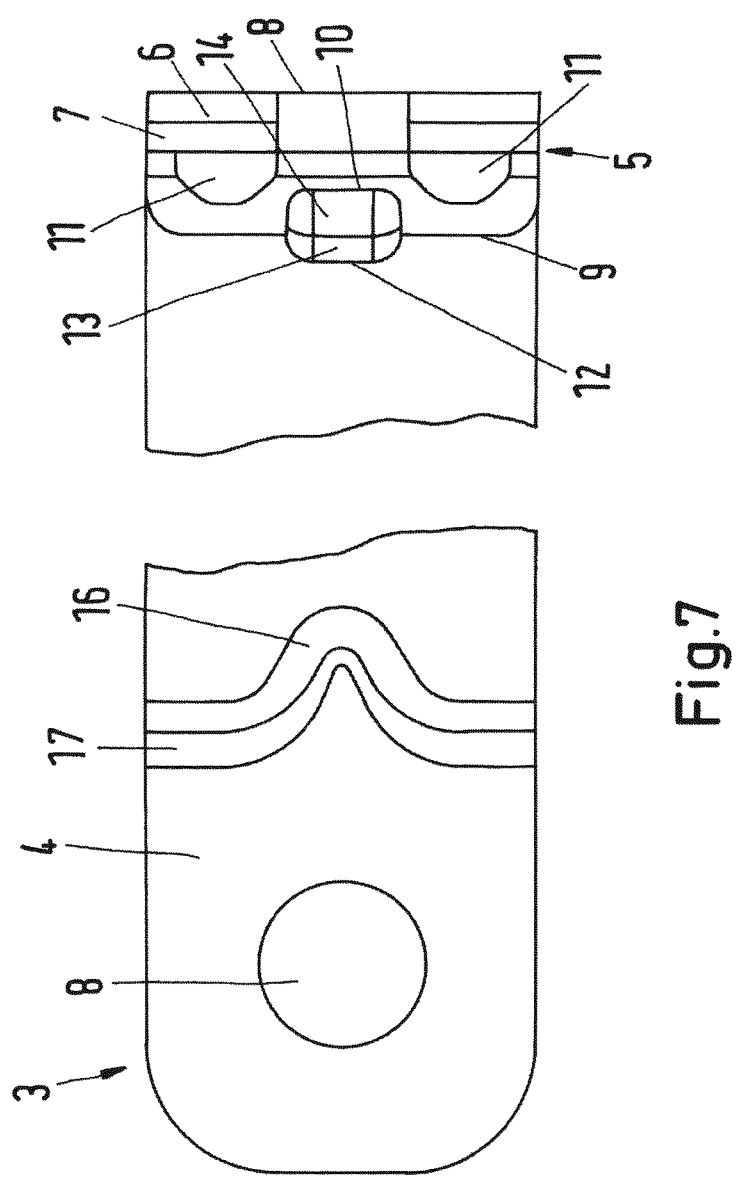

FIG. 7 likewise illustrates that the lug 7 is engaged with the protrusion 12 by means of the recess 10 via the bent end portion 9. This engagement and further design features of the protrusion 12 are illustrated in FIGS. 8 and 9.

Figure 8:
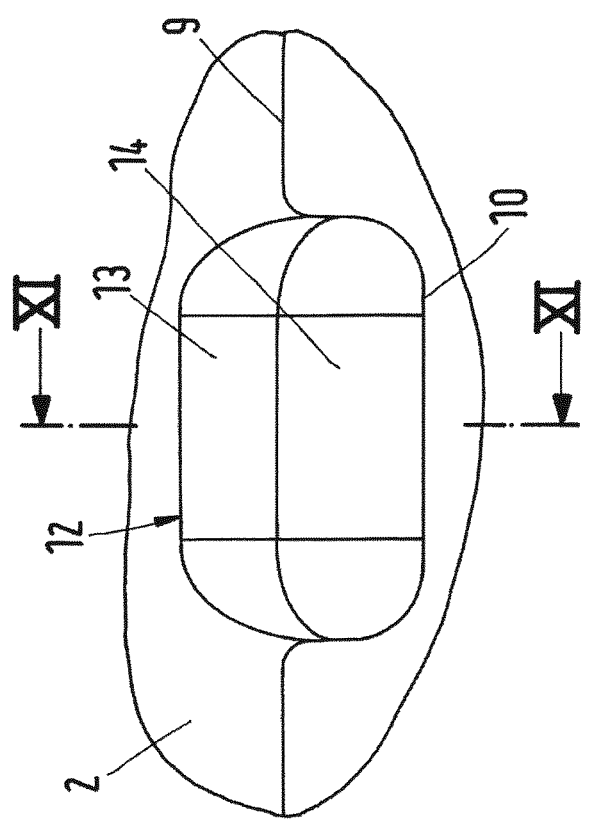
Figure 9:
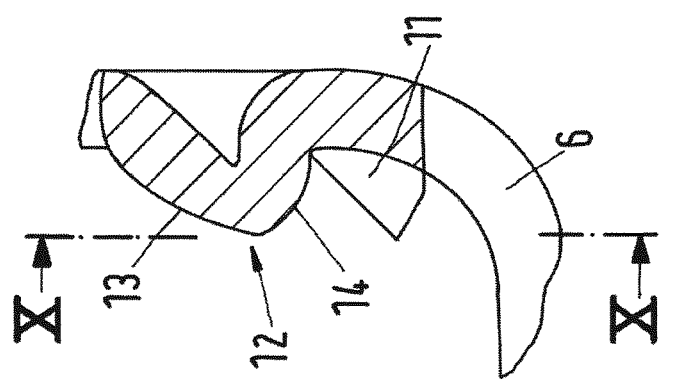

FIG. 8 in this case shows an enlarged view of the engagement of the bent end portion 9 with the protrusion 12. The recess 10 in the bent end portion 9 in this case encloses the protrusion 12 in a form-fitting manner. It is likewise possible to see in the exemplary embodiment illustrated that the extent of the recess 10 in a peripheral direction of the clamp band 2 includes approximately half of an extent of the protrusion 12 in this direction. This ensures that disengagement of the recess 10 from the protrusion 12 as a result of forces that act on the lug 7 in the axial direction of the clamp band 2 is avoided. That portion of the recess 10 that extends in the peripheral direction of the clamp band 2, bears against an axial end side of the protrusion 12 and is formed with an extent of half of the extent of the protrusion 12 in the peripheral direction therefore cannot "slip out" under the protrusion 12 in a peripheral direction toward the lug 7 in the event of forces acting axially on the lug 7.

It is likewise possible to see in FIG. 8 that the protrusion 12 has a greater extent in an axial direction of the clamp band 2 than in the peripheral direction of the clamp band 2. The engagement of the recess 10 with the protrusion 12 on the clamp band 2 serves to latch the lug 7 in its position on the second leg 6 so as to be prevented from rotating. It is thus necessary to provide primarily security with respect to forces that act axially on the lug 7. The protrusion 12 has to be able to reliably absorb forces that act in the axial direction of the clamp band 2. For this reason, it is expedient to give the protrusion 12 a greater extent in an axial direction of the clamp band 2 than in the peripheral direction of the clamp band 2.

The protrusion 12 can in this case be formed in one piece with the clamp band 2. This can happen for example during cold forming of the clamp band 2. As a result, the first flank 13 and the second flank 14 of the protrusion 12 are formed. In this case, the first flank 13 leads into the clamp band 2 at a more acute angle than the second flank 14.

In the exemplary embodiment in FIG. 9, the second flank 14 is also at right angles relative to the clamp band 2. During the production process of the clamp 1, the lug 7 can then be brought into its final position on the second leg 6 as follows. The lug 7 is bent in the direction of the clamp band in the region of the cutouts between the lug 7 and the second leg 6 until that end of the bent end portion 9 that is located opposite the recess 10 comes into abutment against the first flank 13. Then, a force is applied to the lug 7 in the direction of the second leg 6, such that the bent end portion 9 slides down in the direction of the second leg 6 on the first flank 13 until it has passed over the highest point of the protrusion 12 in the radial direction, and the recess 10 is arranged in a position beneath the second flank (that is to say in the direction of the second leg 6). The formation of a right angle at the second flank 14 relative to the clamp band 2 in this case ensures that disengagement of the recess 10 from the protrusion 12 by the action of forces on the lug 7 in the peripheral direction of the clamp band 2 can be prevented.

Figure 1:
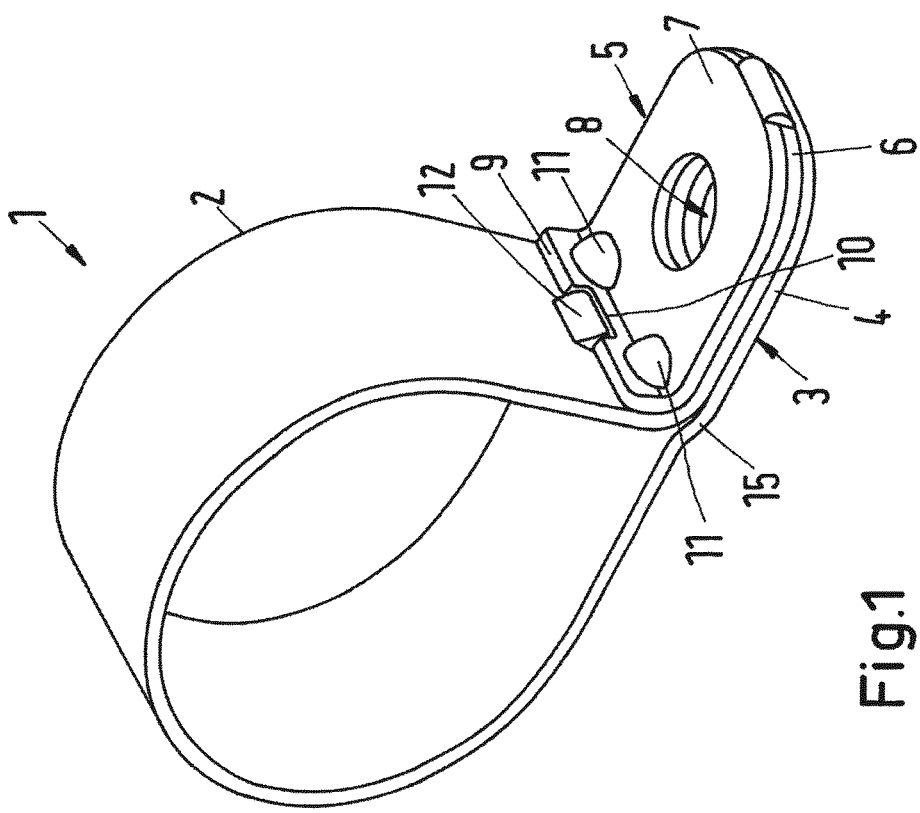
Figure 2:
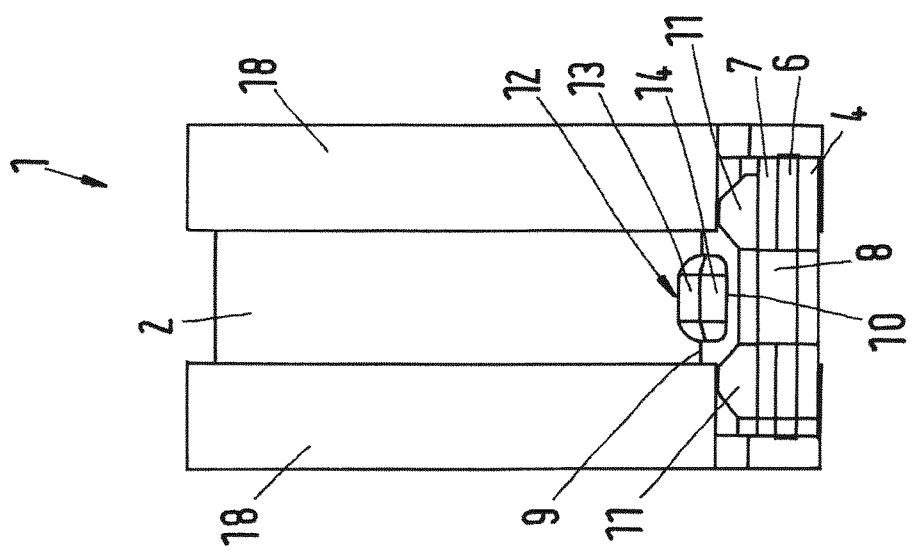
FIG. 2 shows a front view of the clamp 1 in a closed state, covered with a jacket 18.

On both sides of the protrusion 12, it is possible to provide reinforcing beads 11 which are formed both on the second leg 6 and on the lug 7. This can be seen for example in FIGS. 1 and 2. The formation of the reinforcing beads 11 on both sides of the protrusion 12 in this case brings about further reinforcement of the lug 7 in its position and thus latching of the lug 7 on the second leg 6 so as to be prevented from rotating.

The following materials, inter alia, are suitable for the clamp band 2: galvanized steel, chromium steel, chromium-nickel steel, copper, brass, aluminum alloys and magnesium alloys, and fiber composite materials. It is possible to produce the clamp 1 from aluminum alloys because the clamp 1 can be produced in one piece, for example by punching. The supply and fastening of separate component parts made of aluminum, by contrast, is very problematic, since the development of abrasion occurs in an automatic production process; this very use of separate component parts can be dispensed with, however, when the clamp 1 is produced in accordance with the invention.

Figure 10A:
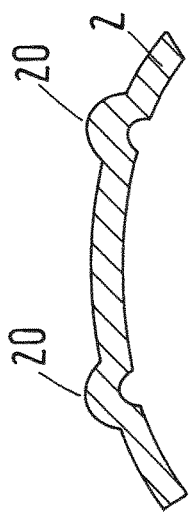
Figure 10B:
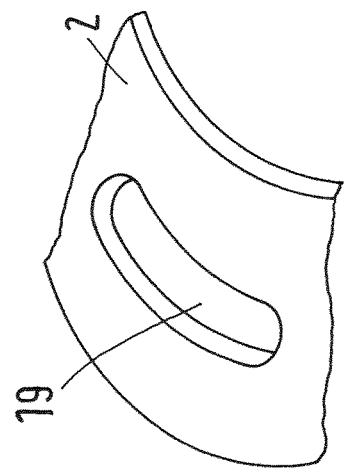
Figure 10C:
Figure 10D:
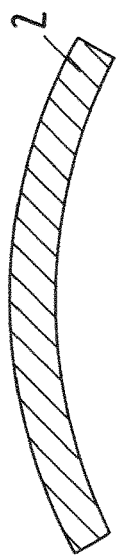
Figure 10E:
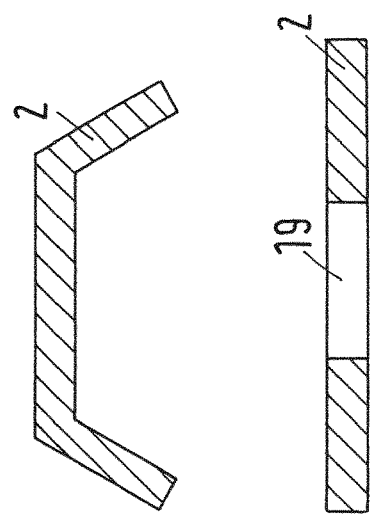
Figure 10F:

FIGS. 10A-F show various embodiments which can be provided for the cross section of the clamp band 2. FIG. 10A in this case shows a rectilinear cross section of the clamp band 2; FIG. 10B shows a clamp band 2 in cross section with a curve and a uniform associated radius of curvature; FIG. 10C shows a clamp band 2 in cross section with a uniform first radius of curvature and two elevations 20 on the clamp band 2, which are formed at a second radius of curvature which differs from the first uniform radius of curvature of the clamp band 2. FIG. 10D illustrates a cross section of the clamp band 2 in which the two axial ends of the clamp band 2 have been bent at a common, particular angle to one another. In the left-hand part of FIG. 10E a rectilinearly configured cross section of the clamp band 2 is shown, wherein the clamp band 2 in this case has a cutout 19; this cutout 19 is limited to a spatially limited region of the clamp band 2, as can be seen from the perspective illustration of the clamp band 2 in the right-hand half of FIG. 10E. Finally, it is also possible to provide for the clamp band 2 to be configured with an undulating cross section. In this case, the radii of curvature of the clamp band 2 that characterize the wave shape can be identical or different. Such a cross section of the clamp band 2 is illustrated in FIG. 10F.

In the context of the present invention, other embodiments that differ from the exemplary embodiment of the clamp 1 described thus far can also be provided.

Figure 11:
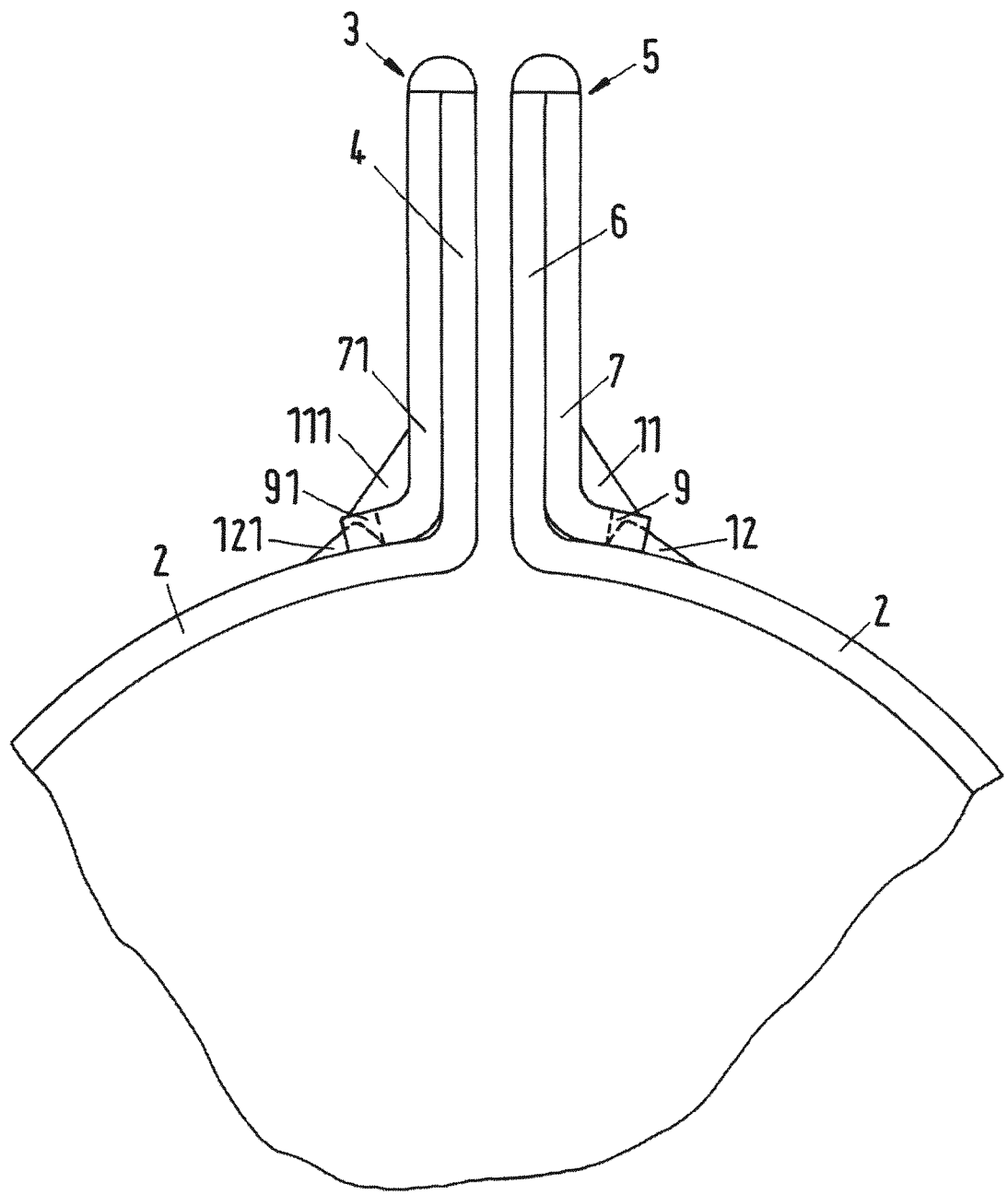

FIG. 11 illustrates a second exemplary embodiment of a clamp 1. Those design features of the clamp 1 that correspond to those of the first exemplary embodiment are provided with identical reference signs. The description given previously for these features also applies in a corresponding manner to the second exemplary embodiment described in the following text.

In the exemplary embodiment in FIG. 11, in addition to the lug 7 arranged on the second leg 6, a lug 71 is also provided on the first leg 4. The angled portion 15 on the first leg 4 of the first exemplary embodiment is accordingly dispensed with here and the first leg 4 is likewise bent approximately at right angles from the clamp band 2, like the second leg 6. The lug 71 is in this case attached to the first leg 4 in the same way as is the case for the attachment of the lug 7 to the second leg 6. The lug 71 also has a bent end portion 91, which is reinforced in terms of rigidity by a reinforcing bead 111. Just like the lug 7 is engaged with the protrusion 12 on the clamp band 2 via a recess 10, the lug 71 is brought into engagement with a corresponding protrusion 121 on the clamp band 2 via a corresponding recess (not illustrated) in its bent end portion 91. Both design features and functional features of the lug 7 which is arranged on the second leg 6 also apply accordingly to the lug 71 which is arranged on the first leg 4.

Figure 12:
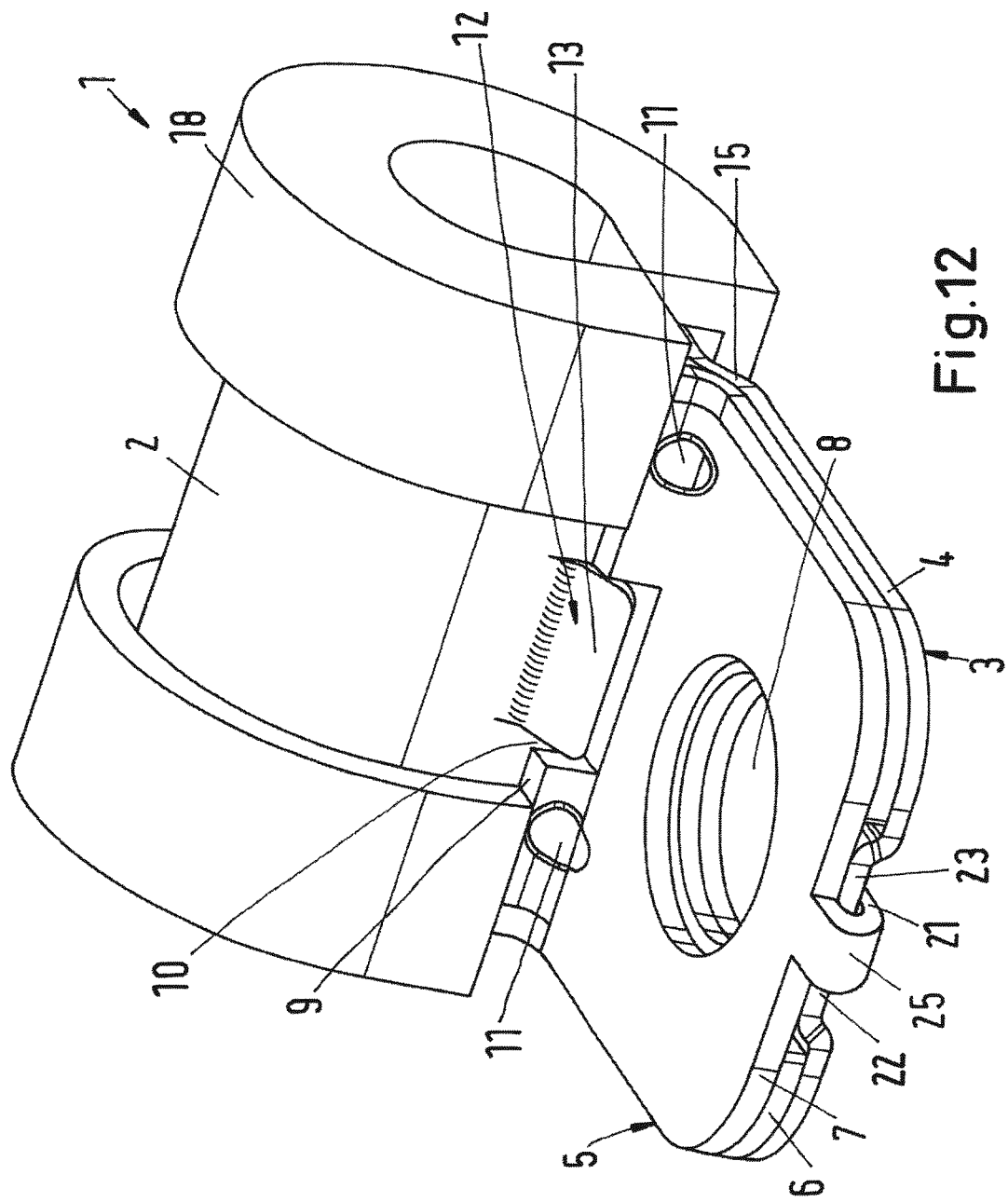

A third exemplary embodiment of the clamp 1 according to the invention is illustrated in FIG. 12. Again, identical features are provided with identical reference signs. A clamp 1 having a prefixing device is specified according to the third exemplary embodiment. As can be seen in FIG. 12, the clamp 1 is identical to the clamp 1 in the first exemplary embodiment apart from the prefixing device. The structural configuration of the prefixing device is described in more detail in the following text with reference to FIGS. 13 to 16.

Figure 13:
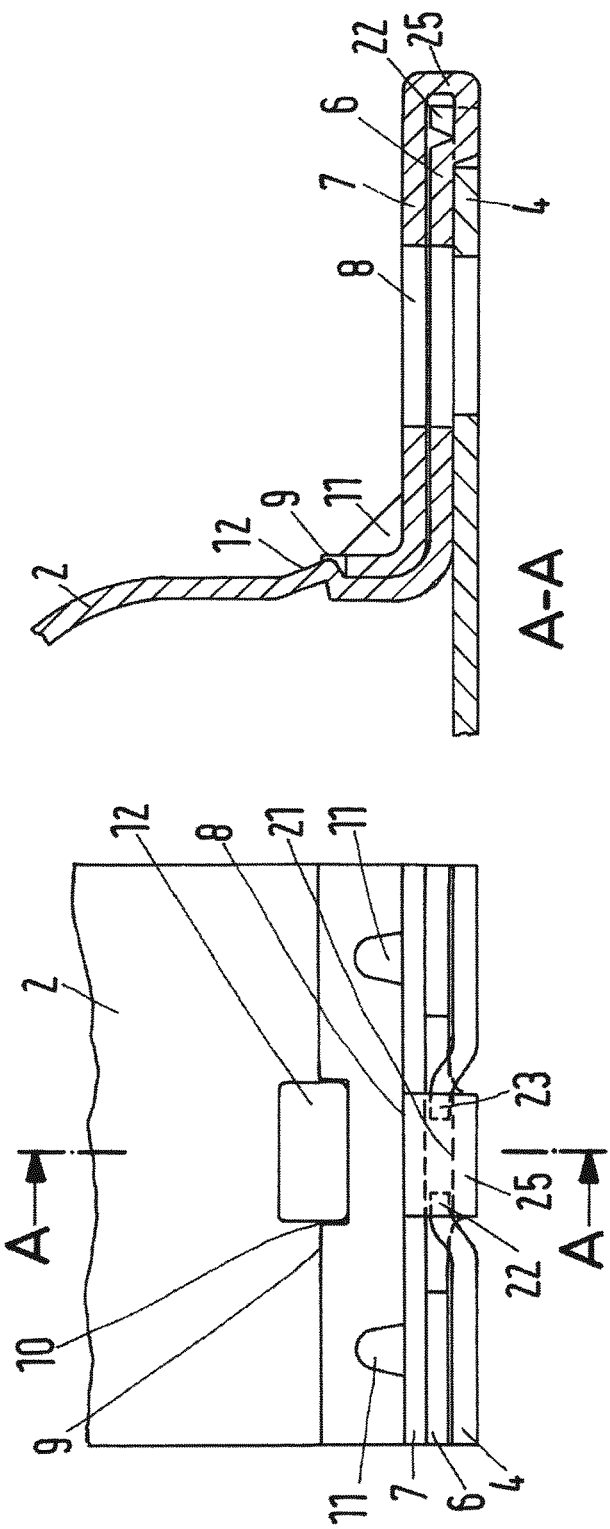

FIG. 13 shows a view of the prefixing device in an open and a closed state of the clamp 1. A section A-A is likewise illustrated. Arranged in the end portion of the second leg 6 is a fastening region 21. In the end portion of the first leg 4, a first and a second fastening element 22, 23 protrude in this case in the direction of the second leg 6. As a result, it is possible to deform the fastening elements 22, 23 plastically onto that side of the fastening portion 21 that faces away from the first leg 4, when the clamp 1 is transferred into a closed state. This can be seen in particular when comparing the open state of the clamp 1 (bottom plan view in FIG. 13) with the closed state of the clamp 1 (top plan view in FIG. 13). The clamp 1 can thus be retained securely on the tubular article to be fastened in a closed state, without the thus produced connection of the two peripheral ends 3, 5 releasing again. The fitter of the clamp 1 can now fasten the latter to the underlying surface by way of corresponding retaining elements without having to worry about the clamp disengaging from the article as a result of loads on the clamp 1, as can occur for example during fitting. The sectional illustration A-A in the right-hand part of FIG. 13 shows the clamp 1 with a prefixing device in the closed state.

Figure 14:
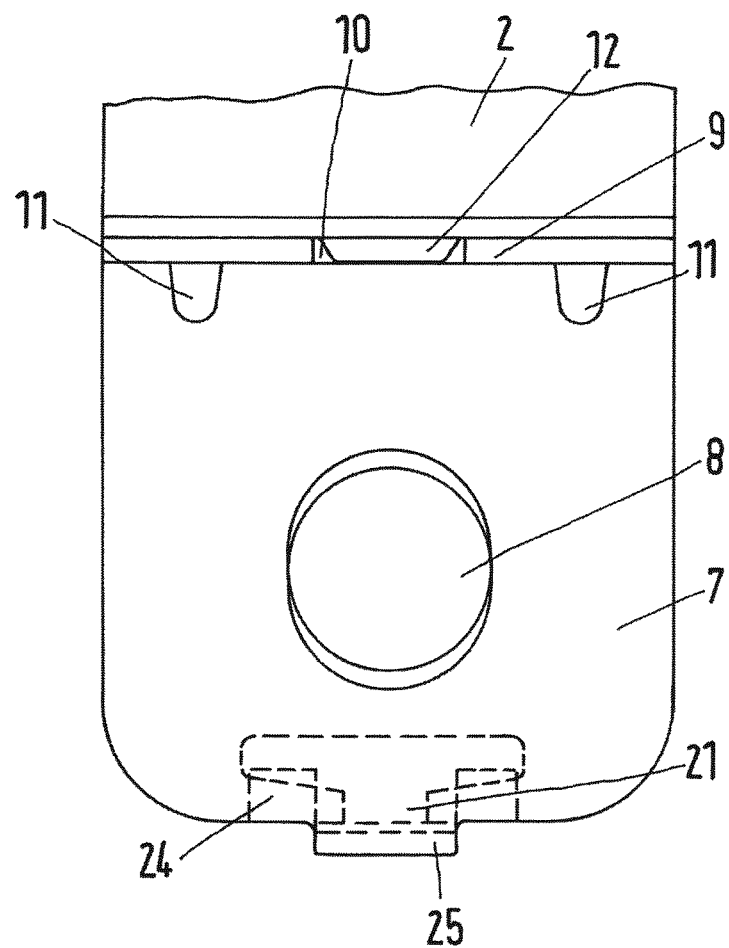

In FIG. 14, the through-opening 8 is configured for example as a slot.

Figure 15:
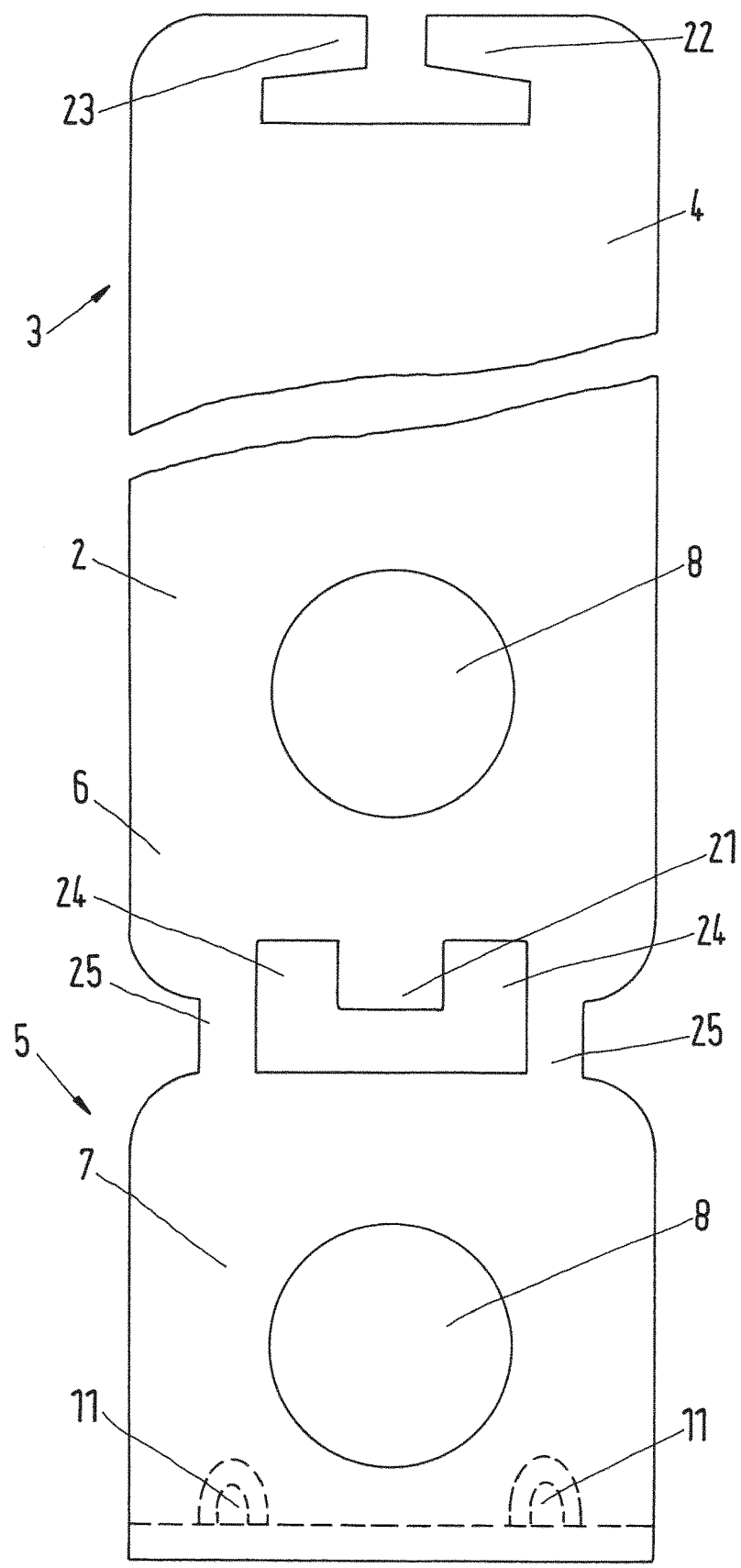

FIG. 15 shows a bent-open clamp band 2 which, in contrast to the clamp band 2 in the first exemplary embodiment in FIG. 5, is provided with the design features of a prefixing device. A first possible embodiment of these features is shown. In the end region of the second leg 6, the latter narrows in order to continue a doubly configured crosspiece 25 integrally into the lug 7. Formed in the axial middle of the second leg 6 is the planar fastening portion 21. The latter is surrounded on both sides by the gap 24, into which the first and second fastening elements 22, 23 of the first leg 4 can project.

Figure 16:
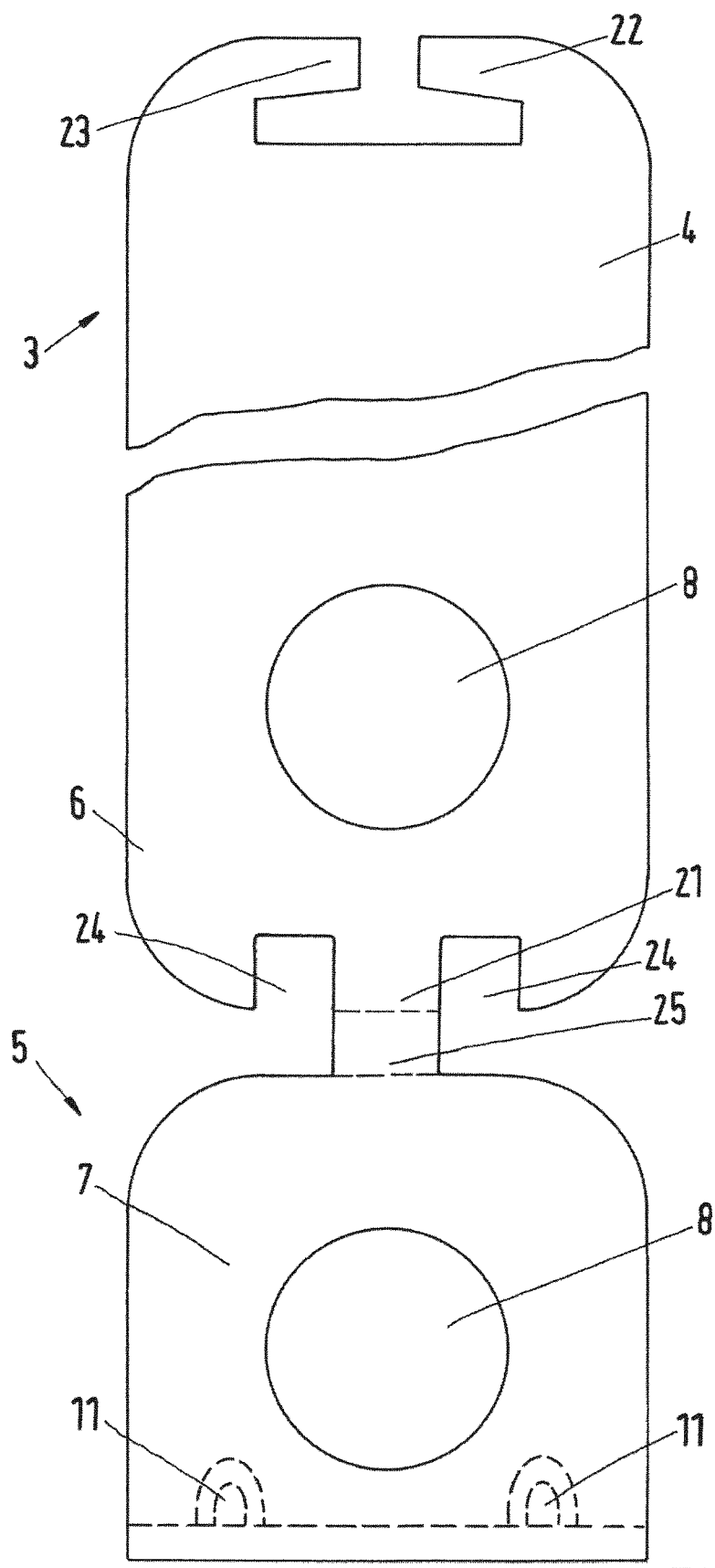

A second embodiment of the prefixing device is shown in FIG. 16. Again, a bent-open clamp band 2 is illustrated, which has a planar fastening portion 21 on its second leg 6 in the axial middle of the latter. Said fastening portion 21 is surrounded by the gap 24 and is continued for its part into the singly configured crosspiece 25. The crosspiece 25 represents the connection of the second leg 6 to the lug 7. The width of the crosspiece 25 can vary depending on the requirements placed on the clamp 1. First and second fastening elements 22, 23 are again provided on the first leg 4 of the clamp band 2, said fastening elements 22, 23 projecting into the gap 24 in an assembled state of the clamp 1.

The invention claimed is:

1. A clamp for fastening tubular articles to an underlying surface, the clamp comprising: a clamp band with a first peripheral end which has a first leg and a second peripheral end which has a second leg, and having at least one lug which is arranged on at least one of the legs on a side opposite the other leg, wherein the clamp band has at least one protrusion which cooperates with the at least one lug, wherein the first leg, the second leg and the lug each have a through-opening, wherein in a closed state of the clamp, the three through-openings overlay one another, wherein at least one lug has one bent end portion which is arranged on a side of the lug that faces the clamp band, wherein the one bent end portion points in a direction away from the leg on which the lug having the bent end portion is arranged, and has a recess, wherein the respective recess and the protrusion associated therewith are engaged with one another in a form-fitting manner.

2. The clamp as claimed in claim 1, wherein the first and/or second leg and the lug arranged thereon are formed in one piece.

3. The clamp as claimed in claim 2, characterized in that cutouts are provided in the transition region between the respective leg (4,6) and the associated lug (7) such that the clamp band (2) narrows in an axial direction of the clamp (1).

4. The clamp as claimed in claim 2, characterized in that the lug (7) forms an end piece of the respective peripheral end of the clamp band (2).

5. The clamp as claimed in claim 2, characterized in that the lug (7) is bent in the direction of the clamp band (2) in the region of a cutout to arrange the lug (7) on the corresponding leg (4,6).

6. The clamp as claimed in claim 1, wherein an extent of the recess in a peripheral direction of the clamp band includes at least half of an extent of the protrusion in this direction.

7. The clamp as claimed in claim 1, wherein the protrusion has a greater extent in an axial direction of the clamp band than in the circumferential direction of the clamp band.

8. The clamp as claimed in claim 1, wherein a radial extent of the protrusion is matched to a radial extent of the respective bent end portion.

9. The clamp as claimed in claim 1, characterized in that the protrusion has a first flank and a second flank in the peripheral direction of the clamp band, wherein the first flank leads into the clamp band at a more acute angle than the second flank.

10. The clamp as claimed in claim 9, characterized in that the second flank is at right angles to the clamp band.

11. The clamp as claimed in claim 1, wherein the first and/or the second leg and the lug arranged thereon have at least one reinforcing bead in the region of the bent end portion thereof.

12. The clamp as claimed in claim 11, wherein the first and/or second leg and the lug arranged thereon have at least one reinforcing bead on each side of the recess in the bent end portion thereof.

13. The clamp as claimed in claim 1, wherein the lug is arranged only on a side of the second leg that faces away from the first leg and the first leg is formed by a portion angled out from the clamp band, said angled portion having at least one reinforcing bead.

14. The clamp as claimed in claim 1, characterized in that, in the open state of the clamp (1), the first leg (4) has at least one fastening element (22, 23) that protrudes in the direction of the second leg (6), and the second leg (6) has a fastening portion (21) that is able to be introduced into a gap (24) between the fastening element (22, 23) and an adjacent region, located opposite the fastening element (22, 23), of the first leg (4), and in that, in the closed state of the clamp (1), the at least one fastening element (22, 23) has been plastically deformed onto that side of the fastening portion (21) that faces away from the first leg (4).

* * * * *